United States Patent [19]

Cardew

[11] 4,351,545
[45] Sep. 28, 1982

[54] STROP RESTRAINING MEANS

[75] Inventor: Kenneth H. F. Cardew, Farnborough, England

[73] Assignee: The Minister for Transport in Her Britannic Majesty's Government of the United Kingdom of Great Britain and Northern Ireland, London, England

[21] Appl. No.: 136,709

[22] Filed: Apr. 2, 1980

[30] Foreign Application Priority Data

Apr. 3, 1979 [GB] United Kingdom ................. 7911680

[51] Int. Cl.³ ............................................. B60R 21/10
[52] U.S. Cl. .................................... 280/806; 280/808; 242/107.2; 188/65.1
[58] Field of Search ............... 280/806, 802, 804, 803, 280/808; 24/136 K, 196, 171, 194; 188/65.1, 65.2, 134; 242/107.2; 297/480, 483; 180/268

[56] References Cited

U.S. PATENT DOCUMENTS 3,588,173  6/1971  Apri .................................... 297/480
3,847,434 11/1974  Weman ............................. 280/802
4,128,261 12/1978  Paitula ............................... 280/806
4,249,708  2/1981  Asano ............................. 242/107.2

Primary Examiner—Robert R. Song
Attorney, Agent, or Firm—Cushman, Darby & Cushman

[57] ABSTRACT

A device to prevent undesirable paying out under excess loading of a strop forming part of a load restraining means (including vehicle seat belts or safety harness) comprises a housing for receiving an intermediate part of a strop and including a roller around which the strop is guided. The roller is mounted so that it becomes dislodged when tension in the strop exceeds a predetermined value and the strop becomes trapped between the roller and a part of the guidance means which is curved in the opposite sense to the roller in order to produce a gradual stress gradient in the strop to reduce risk of parting. The roller is supported on bushes engaging chamfered apertures in flat washers and which will disengage under excessive resultant force on the roller. Slots cut into the ends of the rollers define teeth which serve to support the roller on cam members formed integrally with the housing with lobes which enter the slots on roller displacement.

15 Claims, 8 Drawing Figures

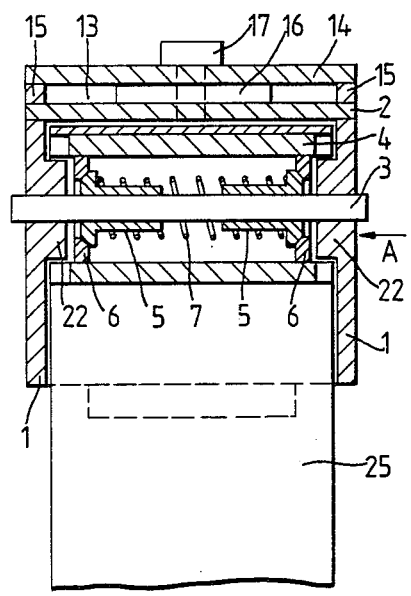
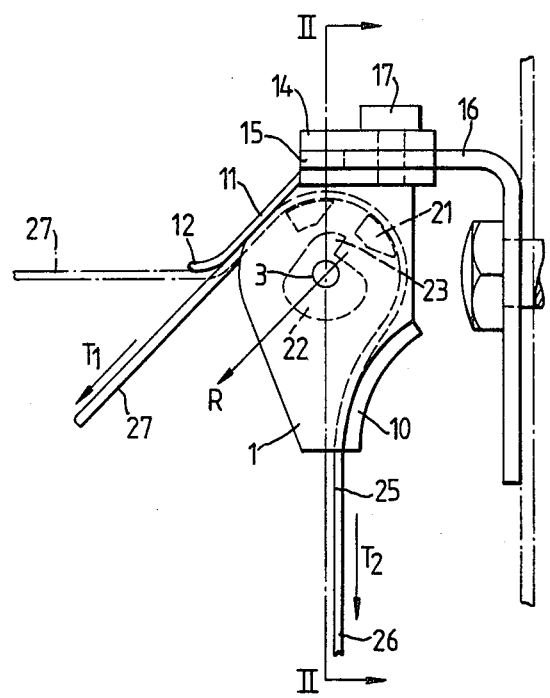
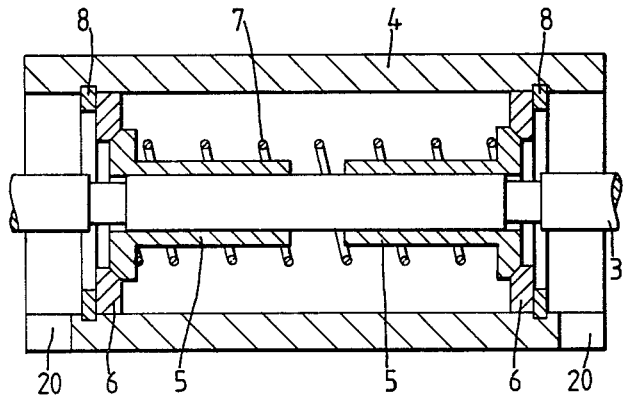
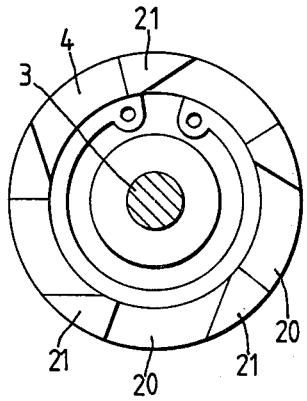
Fig. 2
Fig. 1
Fig. 3
Fig. 4

STROP RESTRAINING MEANS

BACKGROUND AND SUMMARY OF THE INVENTION

This invention relates to strop securing means which may be used for inhibiting undesirable movement of a load restrained by a strop.

In the event of an impact to a vehicle, there may be appreciable movement of a load due to the taking up of slack in, or extension of, a strop used to restrain the load. In particular, in a safety harness as used in motor vehicles there is usually an appreciable length of webbing between an anchorage and the point of engagement with the wearer's body, and additionally an inertia reel, as commonly used, includes extra webbing to permit normal forward movement by the wearer. When impact occurs, the combined movement due to strop extension and the tightening of coils on an inertia reel can be sufficient to permit contact with parts of vehicle structure.

The present invention is directed to the provision of securing means at an intermediate point on a strop whereby the amount of undesirable movement may be limited.

Strop securing means according to the invention comprises a housing containing a roller and means for displacing the roller so that a strop passing around the periphery of the roller will be pressed between the roller and a part of the housing.

In a preferred arrangement the strop is guided around the roller in such manner that predetermined tension in opposite end portions of the strop will act to displace the roller relative to its normal pivotal axis. Preferably, the strop passes around at least 50% of the circumference of the roller and the strop is pressed between the roller and the guiding means.

BRIEF DESCRIPTION OF THE DRAWINGS

Embodiments of the invention will now be described by way of example with reference to the accompanying drawings of which:

FIG. 1 is a side elevation of a strop securing mechanism according to the invention, FIG. 2 is a cross-section of the mechanism of FIG. 1 taken on the line II—II therein, FIG. 3 is a view on an enlarged scale of a roller included in FIG. 2, FIG. 4 is an end elevation of the roller of FIG. 3, FIGS. 5 and 6 are views corresponding to FIGS. 1 and 2 of another strop securing mechanism according to the invention, the section of FIG. 6 being taken on the line VI—VI in FIG. 5.

DETAILED DESCRIPTION OF THE PREFERRED EXEMPLARY EMBODIMENTS

Figure 6:
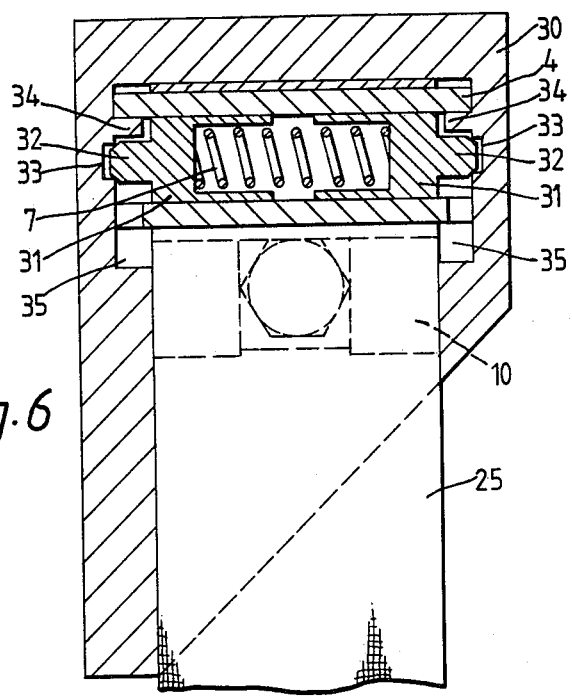

Referring to FIGS. 1 and 2 of the drawings, a strop securing mechanism comprises a housing having two side plates 1, which are spaced apart and depend from the ends of a horizontal cross-member 2. The side plates 1 carry a spindle 3 which supports a hollow roller 4, through the medium of bushes 5 and flat washers 6. As may be seen more clearly from FIG. 3, a pair of flanged bushes 5 is carried on the spindle 3 and urged apart by a coil spring 7 to engage flat washers 6 which fit inside the bore of the roller and are retained in place by circlips 8. The apertures of the washers 6 are chamfered at 45° on their respective inner surfaces, and the outer surfaces of the flanges of the bushes are chamfered at a similar angle, the two sets of chamfers co-operating to maintain the roller concentric with the spindle.

The flat washers are inset from the ends of the roller and the end faces of the roller each have five circumferentially spaced openings 20 (FIG. 4) cut into them to define teeth 21 in such manner that the points of the teeth in both end faces extend in the same direction with respect to the outer surface of the roller, ie the teeth are 'handed'.

Bosses 22, formed on the inner surfaces of the side plates 1 in the regions surrounding the spindle 3, fit inside the ends of the roller and each is partly cut away to a cam shape having a projecting lobe 23 (shown dotted in FIG. 1), the two lobes are also handed so that both project in the same sense if they were to be viewed from, for instance, the direction of the arrow A in FIG. 2.

A curved support plate 10 extends between the side plates 1 of the housing towards the lower portion thereof and a guide plate 11 having a lip 12 extends between the side plates 1 at the upper portion of the housing opposite to the support plate 10 with respect to the spindle 3. A slot 13 defined by a plate 14 spaced above the cross-member 2 by end pieces 15 serves to receive one arm of a bracket 16 which is retained by a pin 17, the housing being thereby adapted for swivel-mounting on a structure such as a door pillar of a motor car.

A strop 25, which may be of webbing material, enters the housing over the inner surface of the curved support plate 10 before changing direction to pass around the roller 4 and emerge beneath the guideplate 11. The lower end 26 of the strop 25 is attached to an anchorage (not shown) which may be fixed or of the inertia locking type.

The outer end 27 of the strop 25 forms part of load restraining equipment such as a safety belt or harness for use by an occupant of a motor car. Normally the strop can move easily through the housing, the roller revolving freely to permit this, to facilitate the tying down of a load, or the assumption and adjustment of a belt or harness by a vehicle occupant.

The effect of acceleration on the load, as for instance due to impact, will be a considerable increase in tension (indicated by the arrows T1, T2 in FIG. 1) in the strop, and, since the strop is constrained around approximately 50% of the roller circumference by the support plate 10 and the guide plate 11, there will be a resultant force on the roller as indicated by the arrow R in FIG. 1. A resultant force of pre-determined magnitude will act through the chamfered surfaces of the flat washers 6 to displace the bushes 5 inwardly towards each other against the pressure of the spring 7, and the roller 4 will become dislodged with respect to the bushes and the spindle 3.

The cam lobes 23 will enter appropriate slots 20 in the roller (according to the rotation thereof) and adjacent teeth 21 will engage with the cams, thus acting to support the roller in a new position. In this position, the roller will bear on the strop so as to press it against the surface of the support plate 10, the strop being thus secured from further movement, which effect is enhanced by friction acting on that part of the strop surface which extends around the roller to the lip of the guide plate 11. Roughening of the surface of the roller, as by knurling, will assist in this respect.

A high coefficient of friction between the roller and the strop will also ensure an extended stress gradient in the strop, thereby reducing the possibility of the strop parting under the loads imposed.

Should the roller become unnecessarily dislodged, it can be readily pushed back into its normal position, concentric with spindle 3 by, for instance, finger pressure applied in a direction opposite to that in which the resultant force R will act.

Where the mechanism is used with a car safety belt the outer end 27 of the strop (or belt) 25 should desirably extend substantially horizontally as shown in dotted lines in FIG. 1 to pass over the wearer's shoulder, the lip 12 acting to ensure that the strop is gently guided into its desired alignment. For the smooth passage of a safety belt through the mechanism the angle of the mounting bracket 16 can be important, since the axis of the swivel pin 17 should pass through the belt anchorage point (or the exit point of an inertia reel housing) and must lie along the belt centre-line at this point. Thus different cars will need differing shapes of bracket.

Too small a roller diameter is likely to give rise to excessive friction which would hinder free movement of a belt wearer, leading in turn to possible discomfort.

Figure 5:
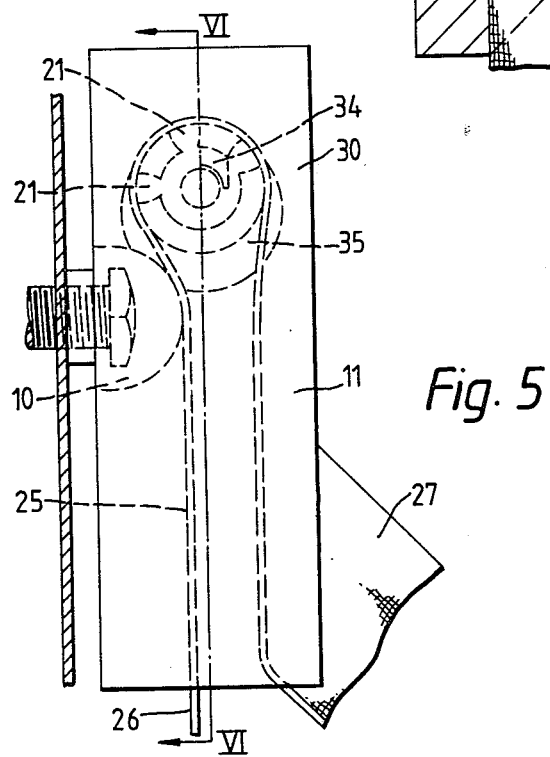

In the embodiment of FIGS. 5 and 6, the same reference numerals indicate corresponding integers to those aforementioned.

A strop 25 having one end 26 attached to an anchorage (not shown) is deflected by a support member 10, disposed within a housing 30 to pass around a roller 4 and over a guide 11 before its outer end 27 emerges to form part of a load restraining equipment. The lower part of the housing 30 and the guide 11 are angled to change the direction of the outer end 27 of the strop as it emerges.

The roller 4 is supported in a pair of bushes 31 urged apart by a coil spring 7 and each having a pintle 32 at its outer end. The pintles 32 are concentric with the roller 4 and have chamfered ends which engage holes 33 in the housing 30 to form journals for the roller. The ends of the roller are cut away to form teeth 21 as before, but the teeth themselves are substantially symmetrical in cross-section. Claw members 34 formed internally of the housing 30 extend into the circular channels defined between the roller and the pintles 32, and circular recesses 35 are cut out of the inner surfaces of the housing excentrically with respect to the holes 33.

When tension in the strop exceeds a desired value, the resultant force on the roller will act to disengage the pintles 32 from the holes 33 and the roller assembly will drop into the recesses 35 with the claw members 34 entering appropriate slots between the teeth 21. The strop will thus become trapped between the roller 4 and the support member 10.

Alternatively in either case the roller may be supported by deformable means such as a bush or filling of foamed plastics material which will be crushed by the action of a predetermined resultant force imposed on the roller by a strop, the roller becoming thereby displaced.

In another embodiment, an inertia sensing device of suitably known type is arranged to release a roller from a freely rotating mode under the influence of an acceleration of pre-determined magnitude (such as might be consistent with impact forces on a vehicle). Conveniently a solenoid may be utilised to maintain the roller in the freely rotating mode with the inertia sensing device arranged to break the electro-magnetic circuit so as to permit displacement of the roller relative to its normal pivotal axis. The inertia sensing device can be connected to a plurality of strop securing means to give consistent and substantially simultaneous operation.

Figure 7:
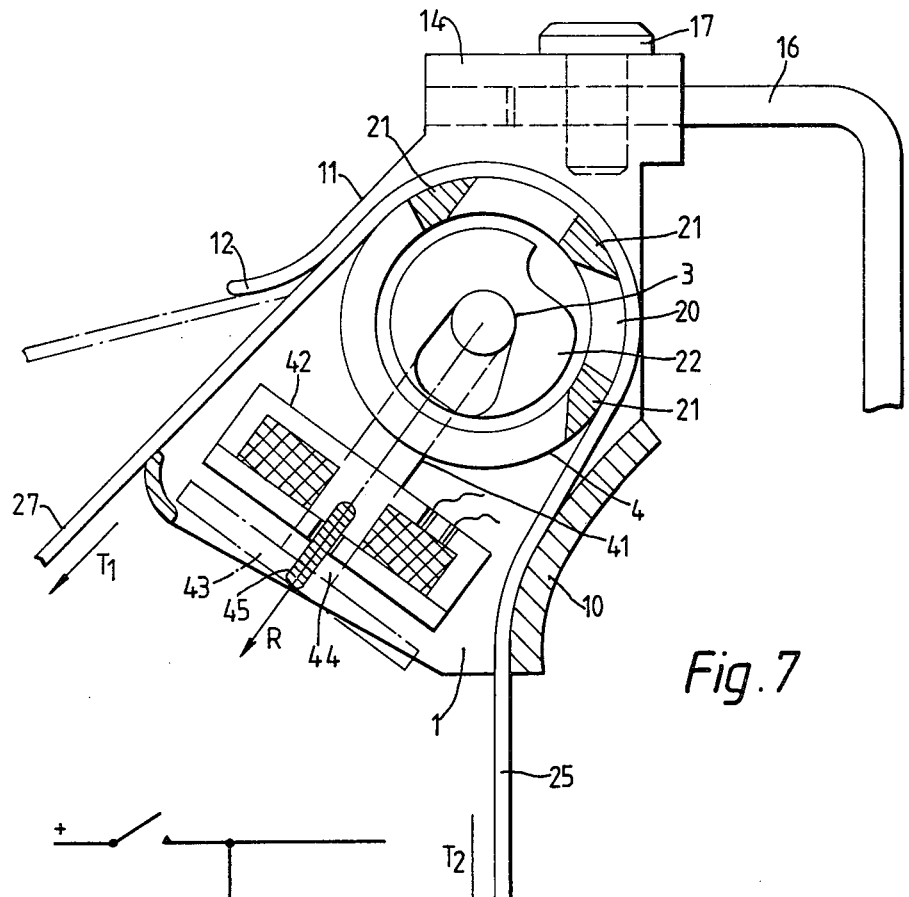
FIG. 7 is another view corresponding to FIG. 1 of a further strop securing mechanism according to the invention.

Referring now to FIG. 7 (in which the same reference numerals are again used to denote corresponding integers aforementioned), a strop 25 passes into a housing over a curved support plate 10, around a roller 4 in the housing and out over a guideplate 11 as previously, the lower and outer ends 26, 27 of the strop being connected to an anchorage and to load restraining equipment respectively in similar fashion. The roller 4 is provided with slots 20 and teeth 21 as before and is mounted for rotation about spindle 3, the ends of which are carried in channels 41 (one shown) formed in sideplates 1 and extending substantially in the direction of resultant force R (see also FIG. 1). A solenoid 42 mounted within the housing is arranged when energised to attract a follower plate 43 having arms 44 (one shown) extending upwardly from opposite sides thereof along the channels 41 to support the ends of the spindle 3. Preferably the arms 44 carry the spindle ends in journal bearings (not shown).

In operation, the solenoid 42 when energised will, through the agency of the follower plate 43 and the arms 44, urge the spindle and its associated roller generally upwardly to the position shown in FIG. 7 when the roller will be free to rotate about its axis to permit easy movement of the strop through the housing within the range of tensions $T_1$ $T_2$ on the strop to be expected in normal use. When the solenoid is not energised, the resultant force R on the roller due to $T_1$ $T_2$ will tend to move the spindle 3 along the channels 41 until a predetermined magnitude of resultant force will cause the slots 20 and the teeth 21 to engage cam-shaped bosses 22 as previously described and the strop will be secured from unwanted movement. Brass guides 45 are provided on the follower plate 43 to assist movement and reduce the possibilities of displacement and consequent jamming. Other variations include a follower plate/roller assembly arranged to drop towards the displaced position under its own weight and, alternatively, a similar assembly biassed in the opposite direction by light spring pressure to assist free movement of a strop over the roller.

Whilst it would be practicable to provide a solenoid of such capacity that this could be overcome by a resultant force of a certain magnitude to give the effect described, this might not be very precise in operation, and it is considered preferable to interrupt the electro-magnetic force in positive fashion by cutting-off the electric current supply. As already mentioned, this can be done by the use of an inertia sensing device arranged to break the electro-magnetic circuit. This should normally be set to operate under the effect of acceleration forces slightly less than would produce a resultant force sufficient to displace the roller of a strop restraining device as just described, to ensure that the solenoid is fully de-energised at the appropriate instant.

Where a strop restraining system incorporating an inertia sensing device as described is used with safety belts or harness in a motor vehicle there is no need for strop anchorage by inertia lock reels, though springloaded spindles or constant force springs might be employed to facilitate storage of free webbing. Moreover a single inertia sensing device can be employed to restrain all safety belts in a vehicle.

Figure 8:
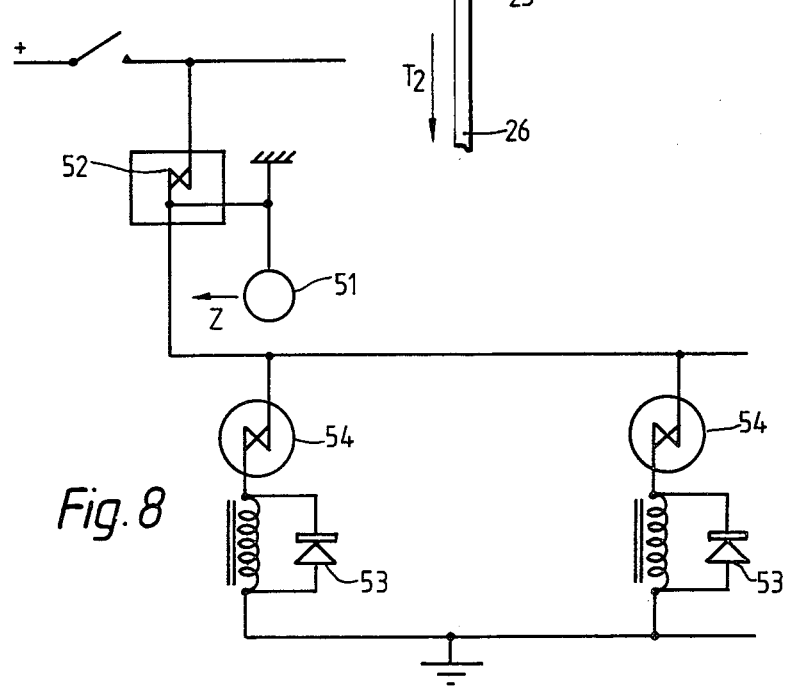
FIG. 8 is a circuit diagram showing an arrangement for operating one more of the mechanisms of FIG. 7.

A circuit suitable for this purpose is set out in FIG. 8. An inertia sensing device, comprising a pendular mass 51 connected to one contact 52 of a normally closed switch so that the switch will by opened only on predetermined movement of the mass as indicated by arrow Z, is located in the current supply to solenoids 53 forming parts of seat belt locking units. As a refinement, pressure switches 54 are provided in series with the solenoids. The pressure switches, normally open, are intended for installation in seats to operate only when a particular seat is occupied.

It is envisaged that solenoid current supply might be in circuit with a vehicle ignition circuit so that solenoids can be automatically energised when the latter is switched on, thereby freeing rollers and enabling belts or harnesses to be conveniently put on by the occupants of a vehicle. This could have an incidental advantage in that it can be arranged for ignition to be automatically switched off in the event of a serious collision.

Generally where a strop comprises a rope or cable the roller may advantageously be in the nature of a sheaved pulley though having teeth formed near its periphery as before for support purposes when in the displaced position. This arrangement is particularly suitable for use in a self-jamming cleat to assist in rope haulage in a sailing vessel. In this case it is preferable that the pulley be maintained in the freely rotating position until the jamming function is required when it may be displaced at will, as by a cam and lever or solenoid arrangement, so as to restrain movement of a rope in one direction to assist in such operations as shortening sail.

I claim:

1. Strop securing means comprising a housing containing a roller having a normal pivotal axis concentrically disposed in said roller, said normal pivotal axis having a fixed position relative to said housing, and means for eccentrically displacing said roller relative to said normal pivotal axis so that said normal pivotal axis is eccentrically disposed in said roller upon displacement, thereby pressing a strop passing around the periphery of said roller between said roller and a portion of said housing.

2. Strop securing means as in claim 1 further comprising means for retaining said roller in a displaced position.

3. Strop securing means according to claim 2 wherein said retaining means comprises cam means associated with said housing for supporting said roller in a displaced position, and engaging means associated with said roller for engaging said cam means when said roller is in a displaced position.

4. Strop securing means as in claim 3 wherein said engaging means comprises means defining openings at the periphery of said roller thereby defining projections arranged to engage said cam means and to support said roller thereon in the displaced position.

5. Strop securing means as in claim 4 wherein said cam means includes means defining a lobe for entering at least one opening in the periphery of said roller to facilitate engagement of said cam means by adjacent projections.

6. Strop securing means as in claim 1 or 2 further comprising means for guiding a strop around said roller so that predetermined tension in opposite end portions of the strop will responsively displace said roller relative to said normal pivotal axis.

7. Strop securing means as in claim 3 wherein the strop extends around at least 50% of the periphery of said roller.

8. Load restraining means comprising strop securing means according to claim 1, or 4.

9. Strop securing means as in claim 1 wherein said displacing means includes means defining cooperating chamfered surfaces for supporting said roller in an undisplaced position, and biasing means for maintaining said cooperating chamfered surfaces in said undisplaced position.

10. Strop securing means comprising a housing containing a displaceable roller having a normal pivotal axis which is coincident with the axis of symmetry of the roller when the roller is in an undisplaced position and a pivotal axis which does not coincide the axis of symmetry when the roller is in a displaced position, said normal pivotal axis having a fixed position relative to said housing, said roller being displaceable about said normal pivotal axis, means for displacing the roller so that said normal pivotal axis is eccentrically disposed in said roller upon displacement thereby pressing a strop passing around the periphery of the roller between the roller and a portion of the housing, and means for retaining the roller in a displaced position, said retaining means comprising cam means associated with said housing for supporting the roller in a displaced position and engaging means associated with the roller for engaging the cam means when the roller is in a displaced position.

11. Strop securing means as in claim 10 further comprising means for guiding a strop around the roller so that predetermined tension in opposite end portions of the strop responsively displace the roller relative to said normal pivotal axis.

12. Strop securing means as in claim 10 or 11 wherein the strop extends around at least 50% of the roller.

13. Strop securing means as in claim 11 wherein said roller is supported within said housing on co-operating chamfered surfaces maintained in normal engagement by spring loading.

14. Strop securing means as in claim 11 wherein said engaging means comprises means defining openings at the periphery of said roller thereby defining projections arranged to engage said cam means and to support said roller thereon in said displaced position.

15. Strop securing means as in claim 14 wherein said cam means includes a lobe shaped to enter at least one of said openings defined in the periphery of the roller to facilitate engagement of said cam means by adjacent projections.

* * * * *